United States Patent Office 3,595,690 Patented July 27, 1971

3,595,690
LEAD SULFIDE PHOTOCONDUCTIVE CELLS

Raymond Cooperstein, Cincinnati, Ohio, assignor to Eastman Kodak Company, Rochester, N.Y.

No Drawing. Filed Sept. 19, 1957, Ser. No. 685,780
Int. Cl. G03c *3/26, 1/00;* H05k *3/00*
U.S. Cl. 117—211 7 Claims This invention relates to infrared sensitive lead sulfide photoconductive cells of improved characteristics.

The photosensitivity of lead sulfide has been known for many years, and crystalline lead sulfide surfaces have been prepared by various methods which can be divided into two groups, generally referred to as chemical deposition and vacuum evaporation, respectively. Both types of lead sulfide cells have been used for the past several years. However, compared to cells according to the present invention, all of these prior cells lack uniformity and have a relatively low sensitivity and are limited in their application to systems which can tolerate such low sensitivity.

The object of the present invention is to provide lead sulfide photoconductive cells of improved characteristics. It is another object of this invention to provide lead sulfide cells whose sensitivites are uniform and are uniformly increased compared to the prior art by a factor of at least 2. In many instances considerably greater increases are realized. In some cases the sensitivities achieved are even higher than some of the "freak" cells obtained occasionally and accidently by prior art processes.

The process employed in the present invention is of the chemical type, that is, of the type in which lead sulfide is precipitated onto a seeded glass surface or other similar substrate by the addition of thiourea to a highly alkaline solution of a lead salt.

The present invention particularly involves a modification of the alkaline lead salt solution or the thiourea solution either before or at the time the two solutions are combined. The invention works particularly well with the delayed immersion effect described by Glassey in application Ser. No. 567,045 filed Feb. 16, 1956. As pointed out in that application, when thiourea is added to the alkaline lead salt solution, the resulting solution is an automatic seeding one for a minute or so (depending on temperature, concentrations, etc.). If one is willing to forego the advantages of the Glassey process, the present invention can utilize this automatic seeding effect.

However, the present invention finds its greatest use and effect when applied to the Glassey process, because the Glassey effect depends on the rate of precipitation after the period of automatic seeding has passed and the present invention provides a peculiarly critical control of the rate of precipitation. Furthermore, since the Glassey process avoids the period of automatic seeding, the preferred form of the present invention requires the use of a preseeded substrate.

The present invention can be used with any type of preseeding of the substrate to be coated such as the mechanical or chemical deposition or thermal evaporation of a seed coat of a metal sulfide or a metal oxide. Alternatively, when a glass base is used, dipping of the glass base in a cationic wetting agent will produce a seed coat. In general, none of these types of preseeding affect the value of the final sensitivity of the cell appreciably, but they do insure that the process will work and that the coatings will be uniform. They provide the centers for crystallization and the sensitivity, in general, is the same whichever form of seeding is used. However, the preferred embodiment of the present invention employs preseeding in colloidal lead sulfide which actually increases the final sensitivity of the lead sulfide cell, providing the other types of seeding, i.e., other centers for crystallization, are kept to a minimum. It is believed that the crystals which form on this preferred type of seed are of a somewhat different form which in some way accounts for the increased sensitivity.

The primary feature of the present invention which provides an improvement in the characteristics of the lead sulfide cells is the presence of a manganese salt in the coating solution. The proportion of manganese salt in the coating solution is quite important. If the manganese salt concentration is below a certain value, the precipitation and crystallization of the lead sulfide proceeds slowly and the change of color effectively stops; the resultant lead sulfide cells are then of considerably decreased sensitivity. Similarly, if the concentration of manganese salt is too high, it is quite impossible to control the rate of precipitation and crystallization of the lead sulfide or to get as useful a product.

According to the present invention, the rate of precipitation of the lead sulfide and hence the crystalline form of the lead sulfide coating is controlled by having a manganese salt in the precipitating solution. It is conceivable that some manganese sulfide is also deposited with the lead sulfide but, if so, the amount of manganese sulfide is quite small. This added manganese is not detectable in ordinary spectroscopic tests of the final coating. The precipitated layer of lead sulfide prepared according to this invention comprises lead sulfide precipitated from a highly alkaline solution of a manganese salt and a lead salt in a ratio of molar concentrations between .0008 and .010 by the addition of a solution of thiourea. In some embodiments the sensitivity is improved if the addition of thiourea is in the presence of an alkali sulfite. The manganese may be in either the lead salt solution or the thiourea solution, or both, before the solutions are combined provided the ratio of total manganese to lead is within the range just specified.

When lead sulfide is precipitated in the above-described manner, it tends to be heavier than the solution and, hence, it tends to sink to the bottom of the container. We have found that the crystallized lead sulfide surfaces are more sensitive if they are allowed to form on the underside of flat substrates placed in the solution. If a flat glass plate, seeded on both sides, is placed in the precipitating solution with one side facing up and the other side facing down, both faces or surfaces of the glass plate receive a coating of the precipitating lead sulfide. However, the lower surface is considerably more sensitive than the upper surface. Actually, the glass plate does not have to be placed horizontally in the precipitating solution since vertical surfaces receive a fairly sensitive coat of lead sulfide but preferably the glass plate is tilted toward a horizontal position so that the sensitivity of the underside or lower surface is increased. Also, to prevent any unnecessary interference with the crystallization of the lead sulfide, agitation of the solution during coating is kept at a minimum.

In a preferred form of the present invention, a highly alkaline solution of lead nitrate or plumbite solution is made up of 170 cc. of distilled water, 100 cc. of a lead nitrate solution containing 100 grams of lead nitrate per liter of water and 90 cc. of sodium hydroxide solution containing 140 grams of sodium hydroxide per liter of water. To this alkaline solution of lead nitrate is added 70 cc. of ethanol immediately prior to addition of the thiourea solution and the resulting solution is brought to a temperature of 23° C. Due to the amphoteric nature of lead this gives a solution of plumbite ion. An aqueous thiourea solution containing 10 grams of thiourea (preferably recrystallized), 0.5 cc. of an 0.1 molar aqueous manganese nitrate solution and 1 gram of anhydrous sodium sulfite in 100 ml. of water is also brought to 23° C. The thiourea solution is added to the lead alkali mixture which then turns amber and, as time progresses, this color becomes darker. In about 8 minutes it becomes a deep gold color. The gold then turns to brown, and finally to black. Just before the solution is entirely black, i.e., when the optical density per centimeter thickness reaches about .5 say, which occurs some 30 seconds after a uniform brown and around 10 to 15 minutes after the start of the process at 23° C., the seeded glass blanks are immersed and the lead and manganese sulfides precipitated onto the seeded surface, the gross precipitate which is settling, and to the coating on the walls of the container. Optical density per centimeter thickness does not include the coating on the walls. Density readings, when taken, are made promptly through clean densitometer windows or cells. However, in practice precise numerical values are not needed. The numerical values are mentioned here only because terminology is simplified thereby. In practice it is quite easy visually to select a time somewhere in the range starting at some moment when the solution becomes quite dark and continuing to some moment several minutes after the solution first becomes quite black. A time anywhere in this broad range gives the optimum effect. An optical density of about .5 per centimeter corresponds to start of this range.

The blanks should remain in the solution for a period of time between 10 and 100 minutes, preferably about 25 to 35 minutes. The cells are then rinsed with cool tap water. The surface of the glas plate which has faced upward or pratially upward in the precipitating solution will be noted to have a dark sooty deposit there and this surface will be found to be relatively insensitive, whereas the other surface which has faced at least partially downward will have a uniform gray appearance. Any loose crystals adhering to the sensitive surface are usually removed by careful swabbing with a camel's hair brush. The surface may be dried either with a blotter or by being allowed to stand in air. The sensitive surface is then ready to receive electrical contacts and to be used as a photoconductive cell. It does not have to be placed in a vacuum.

The rate of reaction in each of the steps described above depends on temperature. The temperature should be between 5° C. and 40° C. and much shorter times are used at the higher temperatures, whereas longer times are used at lower temperatures. The process works quite well at room temperature and, hence, it is for this reason 23° C. was selected in the example given above.

In the precipitating bath, the manganese concentration should be between about $5\times10^{-5}$ and $5\times10^{-4}$ molar. If the manganese concentration is less than $5\times10^{-5}$ the solution does not reach the dark brown stage and the resulting cells are relatively insensitive. If the concentration is above $5\times10^{-4}$ molar at 23° C., the reaction is too fast and uncontrollable. At lower temperatures, the manganese concentration can be somewhat higher than the limits set forth above. The manganese can be in either the thiourea or in the plumbite solution before the two solutions are combined provided the molar concentration in the ultimate precipitating bath is in the range specified. It is sometimes convenient to have the manganese and lead in a single stock solution. The manganese can be in the form of a solution of any water soluble manganese salt such as manganese nitrate, manganese acetate, manganese chloride, and the like. The salt may even be a complex one provided the other metal is not objectionable for some reason not related to the action of the manganese.

The lead concentration with reference to the complete precipitating bath is between .05 and .06 molar, and the actual concentration used depends somewhat on the sodium hydroxide concentration. The sodium hydroxide should be between .55 and .75 molar, the higher concentrations being used with the higher concentrations of lead. The lead is introduced in the form of a water soluble salt, preferably lead nitrate, lead acetate, lead chlorate or lead perchlorate.

The preferred time to add the seeded glass blank to the precipitating solution is within a few minutes either way of when the color of the solution reaches a dark brown, or almost black, color.

Useful cells are obtained when the cell is added anytime within a range between 5 minutes early and 15 minutes late with respect to the "just black" moment, specifically at 23° C. In other terms, if the temperature is between 5° C. and 40° C. preferably between 20° C. and 30° C., one should wait for a period between 5 and 30 minutes from the time the thiourea is added to the lead alkali solution and should then immerse the seeded surface in the precipitating solution for a period of time between 10 and 100 minutes.

The thiourea concentration in the precipitating bath is preferably between .15 and .3 molar. Depending on the manganese concentration, additional sensitivity is sometimes obtained by the addition of an alkali sulfite such as the sodium sulfite mentioned in the example given above. That is, the sulfite concentration should be between 0 and .05 molar. It is more useful at lower manganese concentrations and does not seem to be necessary when the manganese concentration is $5\times10^{-4}$ molar. It will be realized that since the reaction time depends on temperature, factors given above will also vary with temperature at least within the ranges specified. In fact, a change of 4 or 5° C. apparently will change the reaction rate by a factor of 2.

The solution used for seeding the surface prior to immersion in the precipitating bath is preferably an aqueous polyvinyl alcohol solution containing 15 cc. of 0.5 percent polyvinyl alcohol, 235 cc. of distilled water, 0.35 cc. of an aqueous lead nitrate solution containing 100 grams of lead nitrate per liter of water and hydrogen sulfide sufficient to produce a final sulfide ion concentration of about 0.002 normal. The seeding solution is allowed to stand for a period of about 0.5 to 1 hour before the glass blanks are inserted for a period of 0.5 to 0.75 hour.

After the seeded glass blanks have been in the precipitating solution for the desired period of time the reaction is halted by flushing with water. The coated cells are then freed of any sooty lead sulfide deposits by gently stroking the coatings with a wetted camel's hair brush. After drying the cells can be prepared for testing.

It has been found that lead sulfide cells prepared in accordance with this invention possess improved properties particularly after aging.

Prior to aging the lead sulfide cells of this invention exhibit sensitivities, resistances and spectral responses comparable to those cells produced in accordance with the process described in the application of Hammar and Bennett, Ser. No. 567,046, filed Feb. 16, 1956 wherein a soluble copper salt is used in the precipitating bath. However, after aging at ambient conditions for a period of several years, the cells of this invention exhibit increased resistances and sensitivities, and the spectral responses shift to longer wave lengths and higher values. The minute manganese content according to the present invention apparently has two effects. As far as the final cell is concerned, it is associated with the increased sensitivity and particularly with the uniformity of sensitivity of the lead sulfide crystals. The deposited lead sulfide appears to have a preferred uniform crystalline form because of the manganese. Secondly, the manganese provides both the rapidity of precipitation and the control of the rapidity or rate so as to enhance the effect of delayed immersion as discussed above.

I claim:

1. The method of forming a photosensitive layer of lead sulfide crystals which comprises precipitating the crystals onto a glass support by adding a solution of thiourea to an alkali metal hydroxide solution of a lead salt, one of the solutions containing a water soluble manganese salt selected from the group consisting of manganese acetate, manganese nitrate, and manganese chloride, the lead salt being a water soluble salt selected from the group consisting of lead nitrate, lead acetate, lead chlorate and lead perchlorate, the concentrations in the solutions when first combined being as follows: lead between .05 and .06 molar, manganese between $5\times10^{-5}$ and $5\times10^{-4}$ molar thiourea between 0.15 and 0.3 molar, and hydroxide between .55 and .75 molar, immersing the glass support in the combined solutions to receive precipitated crystals of lead sulfide and then drying the surface.

2. The method according to claim 1 in which the immersing is for a period of time between 10 and 100 minutes at a temperature between 5° C. and 40° C.

3. The method according to claim 1 in which an alkali sulfite is added to one of the solutions before they are combined with the concentration of sulfite in the combined solutions less than 0.5 molar.

4. The method according to claim 1 in which the immersing is delayed between 5 and 30 minutes from the time the solutions are combined.

5. The method according to claim 1 in which the immersing is delayed at least until the combined solutions have an optical density greater than .5 per centimeter thickness.

6. The method of forming a photosensitive layer of lead sulfide crystals which comprises precipitating the crystals onto a seeded glass support by adding a solution of thiourea to an alkali metal hydroxide solution of a lead salt and a water soluble manganese salt selected from the group consisting of manganese acetate, manganese nitrate and manganese chloride, the lead salt being a water soluble salt selected from the group consisting of lead nitrate, lead acetate, lead chlorate and lead perchlorate, the concentrations in the solutions when first combined being as follows: lead between 0.5 and .06 molar, manganese between $5\times10^{-5}$ and $5\times10^{-4}$ molar thiourea between 0.15 and 0.3 molar, and hydroxide between .55 and .75 molar, immersing the seeded glass support in the combined solutions to receive precipitated crystals of lead sulfide and then drying the surface.

7. The method of forming a photosensitive layer of lead sulfide crystals which comprises precipitating the crystals onto a glass support, seeded in a stabilized colloidal solution of lead sulfide, by adding a solution of thiourea to an aqueous sodium hydroxide solution of lead nitrate and manganese nitrate with a concentration of lead between .05 and .06 molar, a conrentration of manganese between $5\times10^{-5}$ and $5\times10^{-4}$ molar, a concentration of sodium hydroxide between .55 and .75 molar and a concentration of thiourea between .15 and .03 molar, and immersing the seeded glass surface in the combined solutions to receive precipitated crystals of lead sulfide and then drying the surface.

References Cited

UNITED STATES PATENTS 2,519,454 8/1950 Colbert et al. ------- 88—1R&R
2,659,682 11/1953 Anderson ------------ 117—97

BENJAMIN R. PADGETT, Primary Examiner

U.S. Cl. X.R.

23—134, 300; 117—34, 113, 124B; 250—83.3